United States Patent
Nachiappan et al.

(10) Patent No.: US 12,111,738 B2
(45) Date of Patent: *Oct. 8, 2024

(54) MANAGING DATA CENTER FAILURE EVENTS

(71) Applicant: Wells Fargo Bank, N.A., San Francisco, CA (US)

(72) Inventors: Venkatachalam Nachiappan, Waxhaw, NC (US); Sivamurugan Paramasamy, Waukee, IA (US); Chandrasekaran Sivaraman, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,266

(22) Filed: Mar. 31, 2023

(65) Prior Publication Data
US 2023/0244578 A1 Aug. 3, 2023

Related U.S. Application Data

(63) Continuation of application No. 17/729,639, filed on Apr. 26, 2022, now Pat. No. 11,645,172, which is a continuation of application No. 17/161,193, filed on Jan. 28, 2021, now Pat. No. 11,347,601.

(51) Int. Cl.
| | | |
|---|---|---|
| *G06F 11/30* | (2006.01) | |
| *G06F 11/20* | (2006.01) | |
| *G06F 11/32* | (2006.01) | |
| *G06F 11/34* | (2006.01) | |

(52) U.S. Cl.
CPC ...... *G06F 11/2023* (2013.01); *G06F 11/3006* (2013.01); *G06F 11/328* (2013.01); *G06F 11/3495* (2013.01); *G06F 2201/805* (2013.01)

(58) Field of Classification Search
CPC ............. G06F 11/2023; G06F 11/3495; G06F 11/3051; G06F 11/3006; G06F 11/202; G06F 11/261; G06F 11/3457
See application file for complete search history.

(56) References Cited

U.S. PATENT DOCUMENTS

| | | |
|---|---|---|
| 7,600,146 B2 | 10/2009 | Liccione |
| 9,524,221 B2 | 12/2016 | Li |
| 9,854,002 B1 | 12/2017 | Streete |

(Continued)

OTHER PUBLICATIONS

Saleem et al., Towards a business continuity information network for rapid disaster recovery, Proceedings of the 2008 international conference on Digital government research, pp. 107-116, May 2008.

(Continued)

*Primary Examiner* — Yolanda L Wilson
(74) *Attorney, Agent, or Firm* — Merchant & Gould P.C.

(57) ABSTRACT

Managing data center recovery from failure events can include a failure event platform having aspects provided via a user interface that integrates multiple failure and recovery management and execution features. The features can include, among others, application drift monitoring between production and recovery environments, real-time health checks of system components, user-modifiable scripting for prioritizing and customizing data center recovery actions, and a recovery execution tool.

20 Claims, 20 Drawing Sheets

(56) References Cited

U.S. PATENT DOCUMENTS

| | | | |
|---|---|---|---|
| 9,916,551 B1 | 3/2018 | Bandopadhyay | |
| 10,129,373 B2 | 11/2018 | Firley | |
| 10,255,574 B2 | 4/2019 | Kakade | |
| 10,445,197 B1 | 10/2019 | Harpreet | |
| 2002/0073354 A1 | 6/2002 | Schroiff | |
| 2003/0176993 A1* | 9/2003 | Lines | G06F 11/261 703/22 |
| 2006/0190766 A1* | 8/2006 | Adler | G06F 11/2033 714/E11.073 |
| 2008/0091746 A1 | 4/2008 | Hatasaki | |
| 2008/0126829 A1* | 5/2008 | Robertson | G06F 11/261 714/E11.167 |
| 2011/0225275 A1* | 9/2011 | Shah | H04L 41/0816 709/223 |
| 2012/0259968 A1 | 10/2012 | Anaya | |
| 2015/0205650 A1 | 7/2015 | Schroiff | |
| 2016/0048408 A1 | 2/2016 | Madhu | |
| 2016/0098324 A1 | 4/2016 | Sugabrahmam | |
| 2018/0314439 A1 | 11/2018 | Graham | |
| 2019/0253367 A1 | 8/2019 | Jaisinghani | |
| 2019/0372908 A1* | 12/2019 | Featonby | H04L 41/40 |
| 2020/0112497 A1 | 4/2020 | Yenumulapalli | |
| 2020/0278274 A1 | 9/2020 | Shetty | |

OTHER PUBLICATIONS

Han et al., Research and Implementation on Remote Disaster Recovery System, 2012 International Conference on Computer Science and Service System, pp. 875-879, Aug. 2012.

* cited by examiner

Recovery Management Platform

Applications
Custom Search ▼

| # Remedy ID | Drift | Health | Customizer | Recovery Execution |
|---|---|---|---|---|
| > APP1 | ▯ | ⚙ | ▯ | ▯ |
| > APP2 | ▯ | ⚙ | ▯ | ▯ |
| > APP3 | ▯ | ⚙ | ▯ | ▯ |
| > APP4 | ▯ | ⚙ | ▯ | ▯ |
| > APP5 | ▯ | ⚙ | ▯ | ▯ |
| > APP6 | ▯ | ⚙ | ▯ | ▯ |
| > APP7 | ▯ | ⚙ | ▯ | ▯ |
| > APP8 | ▯ | ⚙ | ▯ | ▯ |

Items per page: 10 ▼    1-8 of 8

Fig. 3

| History Summary Report :: APP5 | | | | | | |
|---|---|---|---|---|---|---|
| Remedy ID | Type | | Custom Date Range | Choose From Date | Choose To Date | |
| APP5 ▼ | Drift ▼ | | Select Date Range ▼ | 5/1/2020 📅 | 6/27/2020 📅 | |
| Select Filter ▼ | Applied Filter for | | | | Submit | Clear |
| | | | | | Filter | Reset Filter |
| Execution Time ↓ | Drift Check | Source Environment | Target Environment | Execution Mode | Drift Overall Status | Later Status |
| 2020/22/06 10:07AM | 📄 | PROD | REC | ONDEMAND | IN_SYNC | DB MW OS |
| 2020/22/06 9:41 AM | 📄 | PROD | REC | ONDEMAND | IN_SYNC | DB MW OS |
| 2020/17/06 5:30 AM | 📄 | PROD | REC | SCHEDULED | IN_SYNC | DB MW OS |
| 2020/16/06 6:44 PM | 📄 | PROD | REC | ONDEMAND | DRIFTED | DB MW OS |
| 2020/21/05 2:11 PM | 📄 | PROD | REC | ONDEMAND | DRIFTED | DB MW OS |
| 2020/21/05 11:11 AM | 📄 | PROD | REC | ONDEMAND | DRIFTED | DB MW OS |
| 2020/20/05 9:50 PM | 📄 | PROD | REC | ONDEMAND | DRIFTED | DB MW OS |
| 2020/20/05 3:21 PM | 📄 | PROD | REC | ONDEMAND | DRIFTED | DB MW OS |
| 2020/20/05 3:20 PM | 📄 | PROD | REC | ONDEMAND | DRIFTED | DB MW OS |
| 2020/20/05 3:19 PM | 📄 | PROD | REC | ONDEMAND | DRIFTED | DB MW OS |

Fig. 9

Issues Summary Report :: APP5

Remedy ID: APP5 ▼

Type: Drift ▼

Custom Date Range: 7 Days ▼

Select Filter ▼    Applied Filter for →    [Submit] [Clear]    [Filter] [Reset Filter]    [Actions ▼]

| Issue ID | Issue Status | Created Date | Assigned To | Completed Date | Drift Status | Later Status | | | Source Env. | Target Env. | Type |
|---|---|---|---|---|---|---|---|---|---|---|---|
| ID1 | OPEN | 06/29/2020 11:29 PM | John Smith | | SOFT-DRIFT | DB | MW | OS | PROD | REC | |
| ID2 | OPEN | 06/29/2020 11:22 PM | John Smith | | SOFT-DRIFT | DB | MW | OS | PROD | REC | |
| ID3 | OPEN | 06/29/2020 2:00 PM | John Smith | | SOFT-DRIFT | DB | MW | OS | PROD | REC | |
| ID4 | OPEN | 06/28/2020 2:00 PM | John Smith | | SOFT-DRIFT | DB | MW | OS | PROD | REC | |
| ID5 | OPEN | 06/27/2020 2:00 PM | John Smith | | SOFT-DRIFT | DB | MW | OS | PROD | REC | |
| ID6 | OPEN | 06/26/2020 2:00 PM | John Smith | | SOFT-DRIFT | DB | MW | OS | PROD | REC | |
| ID7 | OPEN | 06/26/2020 11:08 AM | John Smith | | | | | | | | |
| ID8 | OPEN | 06/25/2020 2:00 PM | John Smith | | SOFT-DRIFT | DB | MW | OS | PROD | REC | |
| ID9 | OPEN | 06/24/2020 2:00 PM | John Smith | | | | | | | | |

Fig. 10

History Summary Report :: APP5
Remedy ID         Type
APP5         ▸ Health Check     Custom Date Range
                                ▸ Today          ▸   [Search] [Clear] [Advanced Search ▽]

| Execution Time ↓ | Health Check | Environment Name | Execution Mode | Overall Health State | Metric Status |
|---|---|---|---|---|---|
| 08/16/2020 9:10 PM | ⚙ | PROD | SCHEDULED | CRITICAL | AA CPU HEAP MEM |
| 08/16/2020 9:10 PM | ⚙ | PROD | SCHEDULED | NA | AA CPU HEAP MEM |
| 08/16/2020 9:00 PM | ⚙ | PROD | SCHEDULED | NA | AA CPU HEAP MEM |
| 08/16/2020 9:00 PM | ⚙ | PROD | SCHEDULED | WARN | AA CPU HEAP MEM |
| 08/16/2020 8:50 PM | ⚙ | PROD | SCHEDULED | WARN | AA CPU HEAP MEM |
| 08/16/2020 8:50 PM | ⚙ | PROD | SCHEDULED | NA | AA CPU HEAP MEM |
| 08/16/2020 8:40 PM | ⚙ | PROD | SCHEDULED | WARN | AA CPU HEAP MEM |
| 08/16/2020 8:40 PM | ⚙ | PROD | SCHEDULED | NA | AA CPU HEAP MEM |
| 08/16/2020 8:30 PM | ⚙ | PROD | SCHEDULED | WARN | AA CPU HEAP MEM |
| 08/16/2020 8:30 PM | ⚙ | PROD | SCHEDULED | WARN | AA CPU HEAP MEM |

Fig. 13

Issues Summary Report :: APP5
Remedy ID     Type     Custom Date Range
APP5     ▼ Health Check     ▼ Today    ▼     [Search] [Clear] [Advanced Search ▽]     [New Issue]

| Issue ID | Issue ID | Created Date | Assigned To | Completed Date | Type | Health State | Category | Status | Execution Mode | Environment |
|---|---|---|---|---|---|---|---|---|---|---|
| ⊖ | OPEN | 08/16/2020 9:20 PM | John Smith | | ☘ | CRITICAL | MEM | | SCHEDULED | PROD |
| ⊖ | OPEN | 08/16/2020 9:10 PM | John Smith | | ☘ | CRITICAL | MEM | | SCHEDULED | PROD |
| ⊖ | OPEN | 08/16/2020 9:00 PM | John Smith | | ☘ | WARN | MEM | | SCHEDULED | PROD |
| ⊖ | OPEN | 08/16/2020 8:50 PM | John Smith | | ☘ | WARN | MEM | | SCHEDULED | PROD |
| ⊖ | OPEN | 08/16/2020 8:40 PM | John Smith | | ☘ | WARN | MEM | | SCHEDULED | PROD |
| ⊖ | OPEN | 08/16/2020 8:30 PM | John Smith | | ☘ | WARN | MEM | | SCHEDULED | PROD |
| ⊖ | OPEN | 08/16/2020 8:10 PM | John Smith | | ☘ | WARN | MEM | | SCHEDULED | PROD |
| ⊖ | OPEN | 08/16/2020 8:00 PM | John Smith | | ☘ | WARN | MEM | | SCHEDULED | PROD |
| ⊖ | OPEN | 08/16/2020 7:50 PM | John Smith | | | | | | | |
| ⊖ | OPEN | 08/16/2020 7:40 PM | John Smith | | ☘ | WARN | MEM | | SCHEDULED | PROD |

Disaster Recovery Execution Process [INITIALIZED]    Elapsed Time: 18 Hrs 57 Mins/ ROT Time: 0hrs    [Actions ▽]
Remedy ID: APP5    Environment: PROD-REC ⊙Approval — ▲DriftCheck — ⊙PreHealthCheck — ⊙FetchScript — ▲RunScript — ▲PostHealthCheck
[APPROVED]   [FAILED]       [GOOD]            [AVAILABLE]     [INITIALIZED]  [NOT_AVAILABLE]

☑ Approval                                                                              [APPROVED]

☒ DriftCheck    ☑ DriftCheck is FAILED Please confirm to proceed further    08/27/2020 11:35 PM    [FAILED]
Execution Type    Execution Status    Execution Time
DriftCheck            FAILED                  08/27/2020 11:35 PM ⟲ PreHealthCheck                                                            08/26/2020 11:40 PM    [GOOD]
Execution Type    Execution Status    Execution Time
PreHealthCheck        GOOD                    08/26/2020 11:40 PM 🗎 FetchScript                                                                                       [AVAILABLE]
Execution Type    Execution Status    Execution Time
FetchScript           AVAILABLE               08/27/2020 4:45 AM 🖥 RunScript                                                                                         [INITIALIZED]

⟲ PostHealthCheck                                                                                   [NOT_AVAILABLE]

| History Summary Report :: APP5 | | | | | | | |
|---|---|---|---|---|---|---|---|
| Remedy ID ▸ APP5 | | | | | | | ← 386 |
| Type ▸ Recovery Execution ▸ Today Custom Date Range ▾ | | | | | | | ← 388 |
| Search | Clear | Advanced Search ▾ | | | | | |

387 →

| Execution ID | DR Type | Source Environment | Target Environment | Status | Stages | App Owner | Requester | Requested Date Time |
|---|---|---|---|---|---|---|---|---|
| ID1 | 📄 | PROD | REC | | ▓▓▓░ | 390 | JS | 08/24/2020 5:13 PM |
| ID2 | 📄 | PROD | REC | | ▓▓▓▓ | | JS | 08/24/2020 4:44 PM |
| ID3 | 📄 | PROD | REC | | ▓▓▓▓ | | JS | 08/24/2020 8:42 AM |
| ID4 | 📄 | PROD | REC | | ▓▓▓░ | | JS | 08/21/2020 11:58 AM |
| ID5 | 📄 | PROD | REC | | ▓▓▓▓ | | JS | 08/21/2020 9:56 AM |
| ID6 | 📄 | PROD | REC | | ▓▓▓▓ | | JS | 08/21.2020 7:55 AM |
| ID7 | 📄 | PROD | REC | | ▓▓▓░ | | JS | 08/20/2020/2:55 PM |
| ID8 | 📄 | PROD | REC | | ▓▓▓▓ | | JS | 08/20/2020 01:05 PM |
| ID9 | 📄 | PROD | REC | | | | JS | 08/20/2020 01:04 PM |
| ID10 | 📄 | PROD | REC | | | | JS | 08/20/2020 12:26 AM |

Issue Summary Report :: APP5

Remedy ID: APP5 | Type: Recovery Execution | Custom Date Range: 7 Days

[Search] [Clear] [Advanced Search ▼]

| Issue ID | Issue Status | Created Date | Assigned To | Completed Date | Type | Recovery Executor Status | Source Env. | Target Env. |
|---|---|---|---|---|---|---|---|---|
| ⊖ | OPEN | 08/27/2020 11:40 PM | John Smith | | ▣ | FAILED | PROD | REC |
| ⊖ | OPEN | 08/27/2020 11:36 PM | John Smith | | ▣ | FAILED | PROD | REC |
| ⊖ | OPEN | 08/27/2020 11:36 PM | John Smith | | ▣ | FAILED | PROD | REC |
| ⊖ | OPEN | 08/27/2020 11:35 PM | John Smith | | ▣ | FAILED | PROD | REC |
| ⊖ | OPEN | 08/27/2020 11:24 PM | John Smith | | ▣ | FAILED | PROD | REC |
| ⊖ | OPEN | 08/27/2020 10:59 PM | John Smith | | ▣ | FAILED | PROD | REC |
| ⊖ | OPEN | 08/27/2020 10:59 PM | John Smith | | ▣ | FAILED | PROD | REC |
| ⊖ | OPEN | 08/27/2020 10:48 PM | John Smith | | ▣ | FAILED | PROD | REC |
| ⊖ | OPEN | 08/27/2020 5:51 PM | John Smith | | ▣ | FAILED | PROD | REC |
| ⊖ | OPEN | 08/27/2020 3:30 PM | John Smith | | ▣ | FAILED | PROD | REC |

Fig. 19

MANAGING DATA CENTER FAILURE EVENTS

BACKGROUND

Institutions use data centers for computing resources to run the digital aspects of their business enterprises, such as data storage, data processing, and application development, testing and execution. When components of a primary data center fail or underperform, e.g., in the event of power loss, equipment damage, equipment malfunction, security breach or hacking event, or due to excessive demand of resources, computing needs are transferred to a back-up or redundant set of computing resources. In some cases, the back-up resources are located at a recovery data center that is physically remote from the primary data center.

Many aspects of data center failure recovery require consideration of a given failure event by humans (e.g., stakeholders of the institution) before one or more aspects of the recovery can be initiated. Heavy reliance on human intervention in data center failure event management can result in inefficiencies and inconsistencies in the recovery process, prolonging the transfer to redundant system and/or under- or over-utilizing computer resources in either or both the primary and recovery environments. These inefficiencies and inconsistencies can be costly to the institution and reduce predictability of recovery outcomes, resulting in, e.g., service interruptions to customers and unnecessary expenditures on computing resources.

SUMMARY

Embodiments of the present disclosure are directed to systems and methods that use and/or operate a computer-implemented data center recovery platform. The platform integrates and automates multiple features of data center recovery. Aspects of the present disclosure relate to integration of one or more of these features via the platform. Further aspects of the present disclosure relate to automated execution of one or more of these features using the platform. The features include, but are not limited to, drift monitoring and detection between production and recovery environments, real-time health checks, stakeholder creatable and modifiable protocols that dictate execution of a recovery process, and robust, partially automated and partially user-executable recoveries for both real and simulated failures. Further aspects relate to applying one or more of the foregoing features to the recovery platform itself. For example, the recovery platform can be used to monitor health and drift of components of the recovery platform in different environments, allowing issues to be addressed that enable the platform to continue operating in the event of a failure or failover.

In one aspect, a system for managing data center failure events includes: one or more processors; and non-transitory computer-readable storage media encoding instructions which, when executed by the one or more processors, causes the system to: monitor drift between a production environment and a recovery environment by using rules on multiple layers associated with the production environment, the multiple layers including an application layer, an operation system layer, a database layer, and a middleware layer, the monitor drift including to compare at at least one of the layers a production version of a component associated with the production environment and a recovery version of the component associated with the recovery environment, and detect, based on the compare, a difference between the recovery version and the production version, the difference corresponding to a detected drift; generate a drift alert based on the detected drift; monitor the production environment by comparing a status of the production environment to a previous steady-state level, including to: monitor a service level associated with functioning of production services associated with the production environment; and monitor an application level associated with functioning of applications associated with the production environment; and automate failover to the recovery environment upon determination of a failure at the service level or the application level, including to execute a failure protocol defined by a failure script, the failure script including aspects associated with the failover.

In another aspect, a computer implemented method includes monitoring drift between a production environment and a recovery environment by using rules on multiple layers associated with the production environment, the multiple layers including an application layer, an operation system layer, a database layer, and a middleware layer, the monitoring drift including comparing at at least one of the layers a production version of a component associated with the production environment and a recovery version of the component associated with the recovery environment, and detecting, based on the comparing, a difference between the recovery version and the production version, the difference corresponding to a detected drift; generating a drift alert based on the detected drift; monitoring the production environment by comparing a status of the production environment to a previous steady-state level, including: monitoring a service level associated with functioning of production services associated with the production environment; and monitoring an application level associated with functioning of applications associated with the production environment; and automating a failover to the recovery environment upon determination of a failure at the service level or at the application level, including executing a recovery protocol defined by a failure script, the failure script including aspects associated with the failover.

Yet another aspect is directed to system for managing data center failure events, the system including: a first piece of computer hardware (such as a first server); a second piece of computer hardware (such as a second server); one or more processors; and non-transitory computer-readable storage media encoding instructions which, when executed by the one or more processors, causes the system to provide a recovery management platform for managing a failover from the first piece of hardware to the second piece of hardware, the recovery management platform being configured to: monitor drift between a production environment and a recovery environment by using rules on multiple layers associated with the production environment, the multiple layers including an application layer, an operation system layer, a database layer, and a middleware layer, the monitor drift including to compare at at least one of the layers a production version of a component associated with the production environment and a recovery version of the component associated with the recovery environment, and detect, based on the compare, a difference between the recovery version and the production version, the difference corresponding to a detected drift; generate a drift alert based on the detected drift; monitor the production environment by comparing a status of the production environment to a previous steady-state level, including to: monitor a service level associated with functioning of production services associated with the production environment; and monitor an application level associated with functioning of applications associated with the production environment; and automate failover to the recovery environment upon determination of a failure at the service level or the application level, including to execute a failure protocol defined by a failure script and a template, the failure protocol including a plurality of steps to be executed in a prescribed order, the plurality of steps including to reroute internet protocol traffic from the first server to the second server.

The details of one or more techniques are set forth in the accompanying drawings and the description below. Other features, objects, and advantages of these techniques will be apparent from the description, drawings, and claims.

DESCRIPTION OF THE DRAWINGS

FIG. 3 is a portion of an example graphical interface generated by the recovery management platform of FIG. 1.

FIG. 9 is a further portion of an example graphical interface generated by the recovery management platform of FIG. 1.

FIG. 10 is a further portion of an example graphical interface generated by the recovery management platform of FIG. 1.

FIG. 13 is a further portion of an example graphical interface generated by the recovery management platform of FIG. 1.

FIG. 14 is a further portion of an example graphical interface generated by the recovery management platform of FIG. 1.

FIG. 17 is a further portion of an example graphical interface generated by the recovery management platform of FIG. 1.

FIG. 18 is a further portion of an example graphical interface generated by the recovery management platform of FIG. 1.

FIG. 19 is a further portion of an example graphical interface generated by the recovery management platform of FIG. 1.

DETAILED DESCRIPTION

Figure 1:
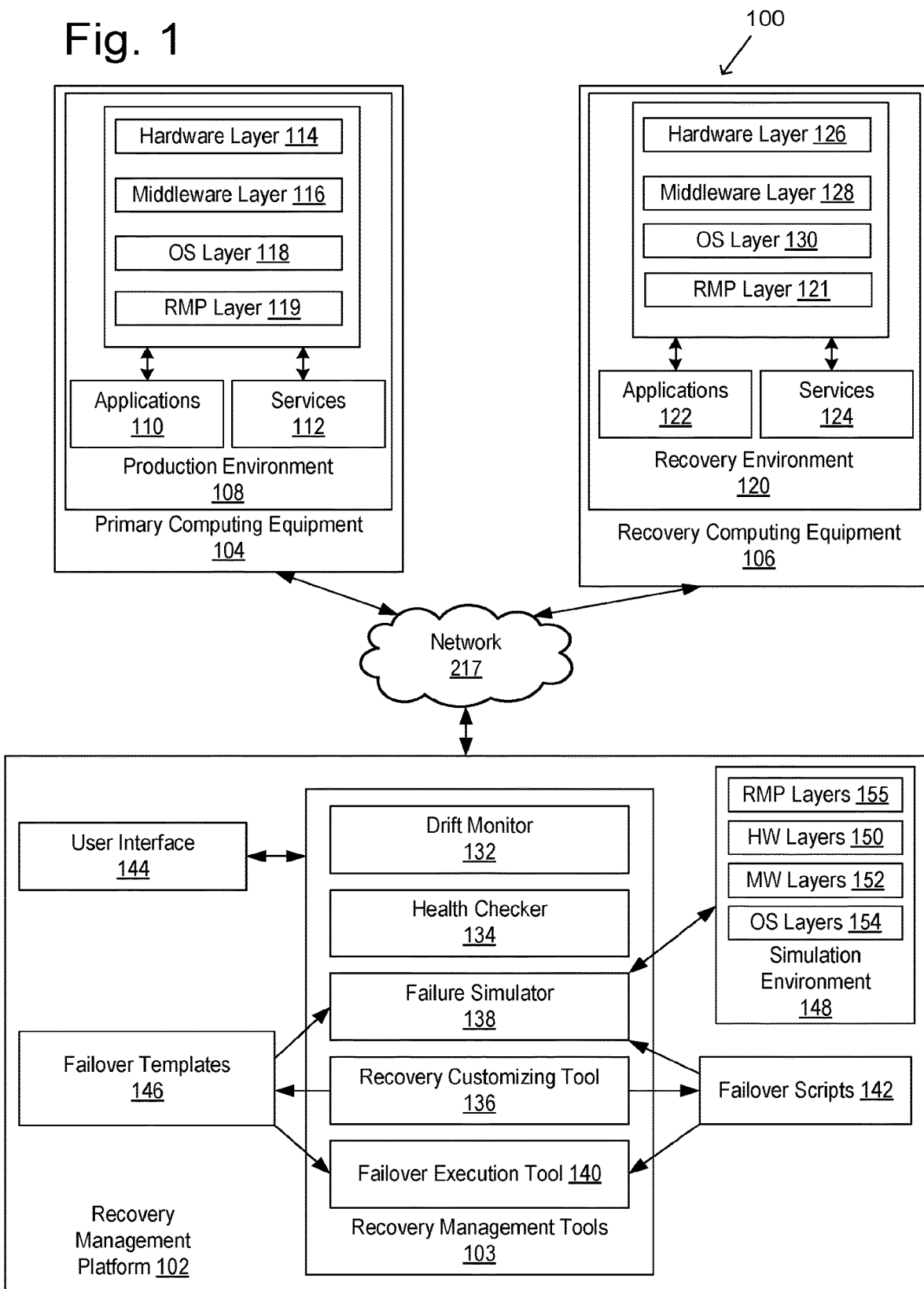
FIG. 1 schematically shows components of an example system according to the present disclosure, the system including a recovery management platform.

The present disclosure is directed to a computer-implemented data center recovery platform that integrates multiple data center failure features. The features include, but are not limited to, one or more of drift monitoring and detection between production and recovery environments, real-time health checks, stakeholder creatable and modifiable protocols that dictate execution of a recovery process, and a partially automated and partially user-executable recovery tool for both real and simulated failures.

Many institutions, such as banks and other financial institutions, run critical applications in the institution's primary computing environments using various servers, networks, mainframes, databases, and other primary computing equipment. One such primary computing environment is a production environment, through which new applications and new versions of applications are deployed. The production environment is the environment in which applications are available for use by users, e.g., stakeholders and customers of the institution. Other example environments include application development and testing environments, which precede the production environment in an application implementation workflow.

Redundancies are built in such that in the event of a failure or performance issue (referred to herein as a "failure event" or "failure") with respect to an application, a network, a server, database, or other aspect of a primary computing environment, computing power can be failed over to back-up or recovery computing equipment. A failover is an automated transfer of computing from a primary environment to a recovery environment. Initiation of a failover or a step of a multi-step failover process can be manual or automated.

The primary and back-up computer resources can be located in the same physical location or they can be physically remote from each other. It can be advantageous for the primary and back-up resources to be physically remote from each other to reduce the probability that an externally caused failure event (e.g., a power failure, a weather event, a seismic event, an explosion, or other geographically localized disaster) would impact both the primary and back-up environments. As used herein, a failure event or failure also includes a system maintenance event, which can require systems or portions of systems to go down during the maintenance and be backed-up elsewhere while the maintenance work is being performed.

Applications, operation systems, middleware, databases, management platforms, and other system elements, have components that can run in multiple environments. As used herein, the term "drift" refers to differentiation between the components or versioning of components of elements running or otherwise utilized in a production environment and the components or versioning of components of those elements running or otherwise utilized in a recovery environment. Drift occurs when an update (e.g., a new version or component) to an element running or otherwise in the production environment has not been integrated into the recovery environment. Thus, for example, drift occurs when versioning or component configuration for a given element in the recovery environment lags the versioning or component configuration for that element in the production environment. Drift can lead to problems during a failure event that requires computing resource utilization to be transferred to recovery resources that run or otherwise utilize the elements in the recovery environment.

In each environment, the various elements can correspond to layers defined by the environment. Such layers can include, for example and without limitation, a hardware layer, a database layer, a middleware layer, a recovery platform layer, an application layer, and an operation system layer. Middleware refers to software used by the application that acts as a bridge between an operation system or database and the application software. Recovery platform refers to a platform for managing failure and recovery events, embodiments and features of which are described herein.

Within a given environment, both applications and services can run. Applications run in an application level of a given environment. Services run in a service level of a given environment. An application is software that is designed to be installed and managed by users, e.g., by stakeholders and customers of the institution. A service is software that is managed for users, including, e.g., Application Program Interfaces (APIs), that users do not use directly. Failures and performance problems can arise in both the application level and service level of a given environment.

Features of the present disclosure can provide advantages in managing primary computing environment failure events, such as a failure events that impact an application, a service, a server, a network, a mainframe, a platform, and so forth.

According to one such advantage, multiple failure event management features and tasks are provided through a single platform accessible by authorized stakeholders.

According to another such advantage, inefficiencies in determining when to initiate a failover can be mitigated. For example, failovers can occur automatically, but only when indicated by pre-defined customized real-time conditions. For instance, if a server associated with the production environment fails, the recovery management platform is configured to notify a relevant stakeholder, identify and report the failure and associated loss of capacity, and allow the stakeholder to decide whether to proceed with a failover or simply tolerate the decrease in capacity until the server can be fixed.

According to another such advantage, inefficiencies and failures in an executed failover are mitigated by identifying and heading off application integration and other performance health issues before a failure event occurs.

According to another such advantage, drift can be monitored in real-time and/or upon user (e.g., stakeholder) request. Such drift can be monitored in multiple application layers. Drift can negatively impact recovery processes and transfers to recovery equipment in a failure event. Identifying drift in real-time can advantageously allow remedial action to be taken before the next failure event occurs.

According to another such advantage, the status of an application production environment can be monitored in real-time and/or upon user request. Such monitoring can identify failing or underperforming components within the production environment and/or the recovery environment that may negatively impact recovery processes and transfers to recovery equipment in a failure event. These production environment health checks can advantageously allow remedial action to be taken before the next failure event occurs.

According to another such advantage, performance triggers and thresholds can be customized by stakeholders. Such triggers or thresholds can determine when a failover is indicated and automatically initiate failover and/or automatically prompt a stakeholder to initiate a failover as appropriate.

According to another such advantage, a simulation environment is provided, and failover problems and inefficiencies can be identified and addressed before a failure event occurs by stakeholder-initiated simulation of a failover in the simulation environment.

According to another such advantage, stakeholder visibility of multifarious components and features of primary computing environment health and recovery procedures implementations is improved by the presentation of interactive user interfaces to manage the recovery platform, including to query and view health metrics and drift metrics, to review and modify scripts that run automated implementation of failovers, and to execute recoveries and review results of previously executed recoveries.

According to another such advantage, the health and status of components used to run and failover the recovery management platform itself can be provided using the recovery management platform of the present disclosure.

The foregoing advantages are not exhaustive. The foregoing and other advantages reflect improvements in the functioning of computers themselves and, particularly the functioning of computer networks in response to computing failure events. The foregoing and other advantages reflect improvements in the technical field of large scale computing maintenance and recovery, which is a broadly applicable technology across multiple industries and enterprises including but not limited to financial institutions and enterprises.

The functions of the recovery management platform of the present disclosure can be implemented using various computing system components, such as one or more processors, operation systems, input/output terminals and non-transitory computer readable storage storing software, e.g., computer readable instructions. One or more of these components can reside on an internal server or group of servers dedicated to the institution. In addition, or alternatively, one or more of these components can reside on one or more external or shared servers using, e.g., cloud computing services. Such cloud computing services are external to the institution and not dedicated to the institution. The recovery management platform, and components of the platform, are configured and networked to have access to the hardware, software, middleware and other components that make up the primary computing environment, as well as to failure recovery or back-up environment components, in order to perform the functions of the platform.

Recovery Management Platform Tools and Methods of Using the Same

FIG. 1 is a schematic representation of a system 100 that uses a recovery management platform 102 of the present disclosure. The system 100 includes primary computing equipment 104 (e.g., a mainframe forming part of an institution's internal computing infrastructure) and recovery computing equipment 106. The primary computing equipment 104 and recovery computing equipment 106 can interact with each other and with the recovery management platform 102 via a network 217, such as the Internet, or one or more intranets.

Different environments run using elements of the primary computing equipment 104. For example, an application production environment, or production environment 108, runs on the primary computing equipment 104. Application development and testing environments can also run on the primary computing equipment 104. Applications 110 and services 112 are run using different computing layers corresponding to the different elements in each environment where the application or service is needed. Thus, each environment includes multiple computing layers. For example, the production environment 108 includes, in addition to an application layer, a hardware layer 114, a middleware layer 116 an operation system (OS) layer 118, and a recovery management platform (RMP) layer 119 for running the applications 110 and the services 112.

A recovery environment 120 runs on the recovery computing equipment 106, which is distinct and/or physically remote from the primary computing equipment 104. The recovery environment 120 is intended to mirror the production environment 108 and to handle production environment tasks that have failed over to the recovery environment upon triggering failure event by running applications 122 and services 124. In addition to the applications 122 and services 124, the recovery environment 120 includes a hardware layer 126, a middleware layer 128, an OS layer 130, and a RMP layer 131 for running the applications 122 and services 124.

Drift occurs when there are versioning or application component configuration discrepancies between computing elements in two different environments, such as production and recovery environments. For example, prior to entering the production environment 108, a new component or new version of a component (such as a database component, middleware component, application component, operation system component, RMP component, etc.) can be developed and tested in a development environment. Once development is finalized, the new component or version is transferred to the production environment 108. However, the corresponding update may not be integrated for the recovery environment at the same time, producing a versioning or configuration lag between the production and recovery environments.

The recovery management platform 102 can be run on internal or external (e.g., cloud) computing resources. The recovery management platform 102 includes recovery management tools 103 for managing and implementing improved failure recovery procedures between the production environment 108 and the recovery environment 120. User interaction, such as viewing output data and providing input instructions and data, with the tools 103 is provided via one or more user interfaces 144 which can be associated with one or more client computing devices that run the platform 102. The user interface 144 can include graphical, touch, audial, and/or other input/output components for interacting via the interface. For example, data obtained by one or more of the tools 103 can be displayed using the interface 144.

The tools 103 include a drift monitor 132, a health checker tool 134, a recovery customizing tool 136, a failure simulator 138, and a failover execution tool 140.

The drift monitor 132 is configured to monitor and reports drift between the production environment 108 and the recovery environment 120 in real-time and/or in response to user drift queries via the interface 144.

The health checker tool 134 is configured to monitor and report the health status of components of the production environment 108 and the recovery environment 120 relative to a predefined baseline health status in real-time and/or in response to user health check queries via the interface 144.

The recovery customizing tool 136 is configured to allow an authorized user, via the interface 144, to view and modify failover scripts 142 that execute failover tasks via the failover execution tool 140 when indicated by one or more real-time metrics. The scripts 142 dictate the conditions that trigger failover initiation and subsequent failover steps.

The recovery customizing tool 136 is also configured for users, via the user interface 144, to produce failover templates 146. Each template 146 can be linked to one or more of the scripts 142. Each template 146 corresponds to a different type of failover event. For instance, each software product, operation system, hosting platform, mainframe, and other computing elements, may have unique aspects that are required when failover occurs. The template 146 can standardize all these aspects for a particular type of environment and failover state, regardless of the computing element, thereby improving recovery automation efficiency. The templates 146 can be used by the failure simulator 138 and the failover execution tool 140. For example, part of the customization of a failure script using the recovery customizing tool 136 can include generating a template 146 that defines one or more aspects of the failure script.

The failover execution tool 140 executes the scripts 142, including the templates 146, to automatically execute failover protocols when indicated.

The failure simulator 138 simulates a selectable failure event in the production environment using a simulation environment 148 that is distinct from the production environment 108. The simulation can pro-actively identify recovery implementation issues before a recovery is triggered. The simulation environment 148 includes multiple layers. In some examples, the simulation environment 148 includes layers that correspond to the layers of the production environment 108 and/or the recovery environment 120. For example, the simulation environment 148 can include hardware (HW) layer(s) 150, middleware (MW) layer(s) 152, OS layer(s) 154, and RMP layers 155.

Additional features of the tools of the recovery management platform 102 will be described below in connection with FIGS. 3-19, which depict example graphical user interfaces that can be generated by the recovery management platform 102 using the user interface 144.

Figure 2:
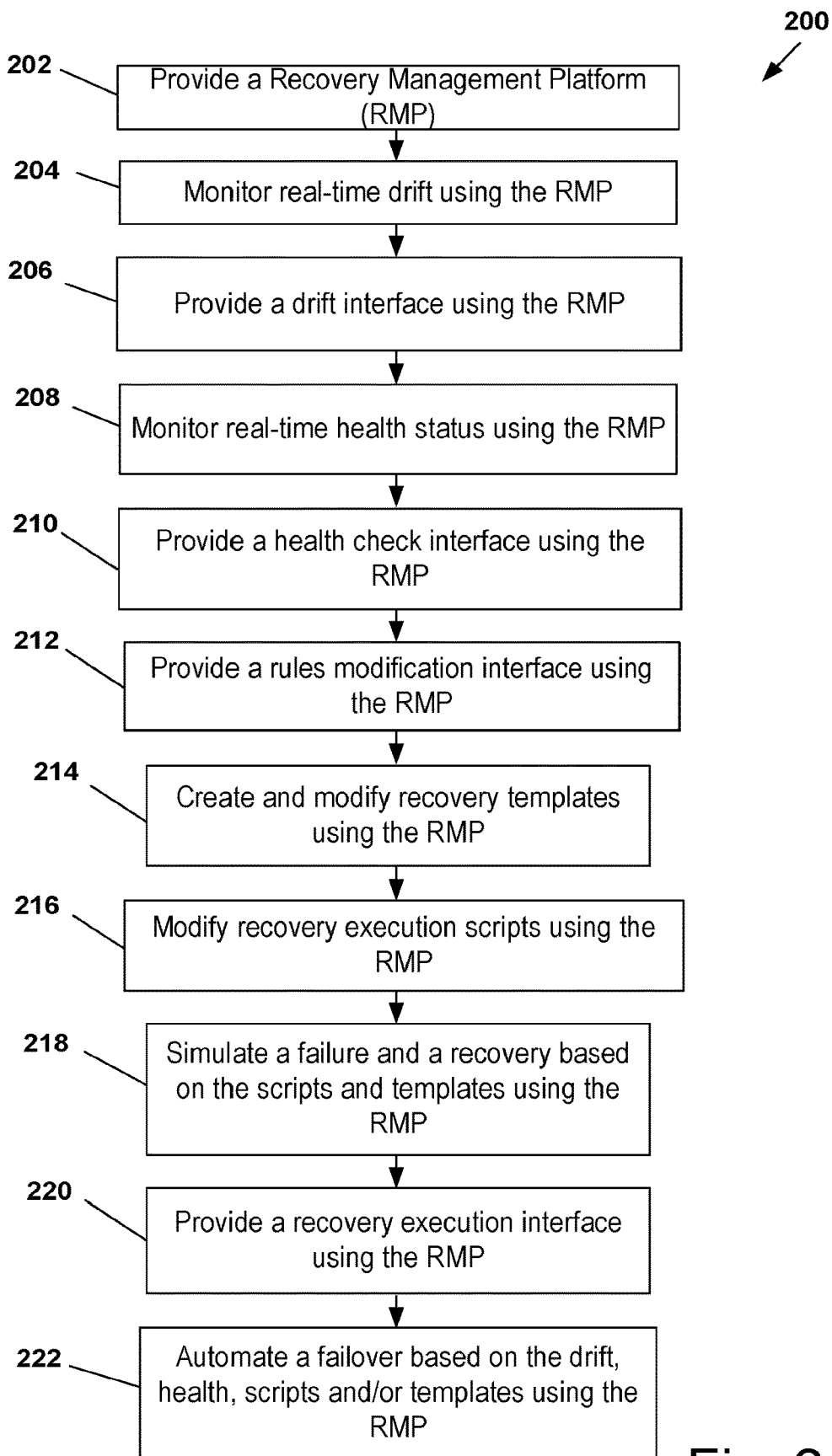
FIG. 2 is an example process flow that can be performed using the system and recovery management platform of FIG. 1.

FIG. 2 is an example process flow 200 that can be performed using the system 100 and recovery management platform 102 of FIG. 1.

Methods can be performed without all of the steps of the process flow 200. In some examples, method steps of the process flow 200 can performed in a different order than the orders that are illustrated.

Referring to FIG. 2, at a step 202 of the process flow 200, a recovery management platform (RMP), such as the recovery management platform 102 of FIG. 1, is provided. From the step 202, in some example methods, the process flow advances to the step 204.

At a step 204, the RMP monitors real-time drift between environments. For example, the RMP monitors drift at multiple layers between a production environment and a recovery environment. The monitoring can be initiated automatically at predetermined intervals and/or in response to detected failure stimuli and/or in response to a stakeholder query. In addition, the RMP can report drift and/or provide drift alerts or notifications to stakeholders, e.g., by sending emails, text messages, audio messages, etc. The step 204 can be performed using the drift monitor 132 (FIG. 1). From the step 204, in some example methods, the process flow advances to the step 206 or the step 208.

At a step 206, monitored drift is displayed using a drift interface generated by the RMP. Through interaction, various drift interfaces can be provided that report current drift, historical drift, and severity of drift information associated with different computing layers and between different environments. The step 206 can be performed using the drift monitor 132 (FIG. 1). From the step 214, in some example methods, the process flow advances to the step 208.

At a step 208, the RMP monitors (or checks) real-time health status of applications and services running in different environments and identifies components of applications and services having performance metrics indicating that remedial action should be taken. The monitoring can be initiated automatically, at predetermined intervals, and/or in response to detected stimuli, and/or in response to a stakeholder query. In addition, the RMP can report health status and/or provide health alerts or notifications to stakeholders. The step 208 can be performed using the health checker tool 134 (FIG. 1). As part of the step 208, the health checker tool 134 (FIG. 1) can compare current health metrics with predefined baseline health metrics to identify health issues that may require remedial action. From the step 208, in some example methods, the process flow advances to the step 210 or the step 212.

At a step 210, monitored health is displayed using a health check interface generated by the RMP. Through stakeholder interaction, various health interfaces can be provided that report current health status, historical health status, and severity of health issues information associated with different applications and services in different environments. The step 210 can be performed using the health checker tool 134 (FIG. 1). From the step 210, in some example methods, the process flow advances to the step 212.

At a step 212, a rules modification interface is generated by the RMP. Through stakeholder interaction, various scripts-related interfaces can be provided that display various information, scripts, script creation interfaces, templates creation and modification interfaces, and other script creation and modification interfaces. Further script-related interfaces can provide for submission of new or modified scripts and provide for requesting and receiving approval of new or modified scripts. The step 212 can be performed using the recovery customizing tool 136 (FIG. 1). The step 212 can include generating interfaces use at the step 214 and the step 216.

At the step 214, the RMP provides interfaces for viewing, creating and modifying templates to standardize the recovery aspects for a particular type of environment and failover state, regardless of the computing element, that dictate when a recovery (e.g., a failover) is triggered. The templates 146 (FIG. 1) can be used to create and modify the scripts run by the failover execution tool 140 (FIG. 1). The step 214 can be performed using the recovery customizing tool 136 (FIG. 1). Thus, the step 214 be included within the step 216.

At the step 216, stakeholders can create new recovery execution scripts and/or view and/or modify existing recovery execution scripts using interfaces and templates generated at steps 212 and 214. The step 216 can be performed using the recovery customizing tool 136 (FIG. 1). The scripts delineate the steps and other aspects or parameters that determine when a failover is automated by the recovery management platform 102 (FIG. 1). The scripts are executable by the failover execution tool 140 (FIG. 1) to execute a failover or other remedial action according to the contents of the scripts. From the step 216, in some example methods, the process flow advances to the step 218 or the step 220 or the step 222.

At a step 218, a stakeholder can perform simulation in a simulation environment using the RMP. Within a simulation environment the simulation simulates a failure of a predetermined component required for a predetermined source environment and a recovery or attempted recovery from that failure based on the scripts, which can include the templates. Aspects of a simulation can be controlled, monitored, submitted for approval, approved, executed and reviewed using simulation interfaces generated by the RMP. The step 218 can be performed using the failure simulator 138 (FIG. 1). From the step 218, in some example methods, the process flow advances to the step 220.

At a step 220, the RMP generates user interfaces for executing an actual recovery according to the scripts and their corresponding protocols. A recovery is requested, approved or rejected and, if approved, the recovery can be initiated using the interfaces. Upon initiation, the process flow advances to the step 222.

At a step 22, the RMP automates a failover in response to a failure and based on a real-time drift identified by the drift monitor 132 (FIG. 1), a real-time health status identified by the health checker tool 134 (FIG. 1), the scripts and/or the templates, and stakeholder input.

Recovery Management Platform Interfaces

The user interfaces illustrated in FIGS. 3-19 are graphical user interfaces (GUIs) that generally allow the recovery management platform 102 to receive inputs and provide outputs.

Referring to FIG. 3, a portion of an example user interface 300 generated by the recovery management platform 102 (FIG. 1) is illustrated.

The GUI 300 includes an applications dashboard 301 that is accessible, via login credentials, to authorized stakeholders of the institution. The dashboard 301 includes a search field for searching for a particular application or set of applications. The dashboard 301 includes a list 302 of applications 304, each corresponding to a selectable drop-down menu 303 for that application. It should be appreciated that the selectable applications 304 can include applications used by the recovery management platform itself. Selectable tools are provided for each application 304. The tools are selectable via graphical elements. The drift monitor tool, for a given application 304, is selectable via the corresponding graphical element 305. The health checker tool, for a given application 304, is selectable via the corresponding graphical element 306. The recovery customizing tool, for a given application 304, is selectable via the corresponding graphical element 307. The failover execution tool and the failure simulator tool, for a given application 304, are selectable via the corresponding graphical element 308.

Figure 4:
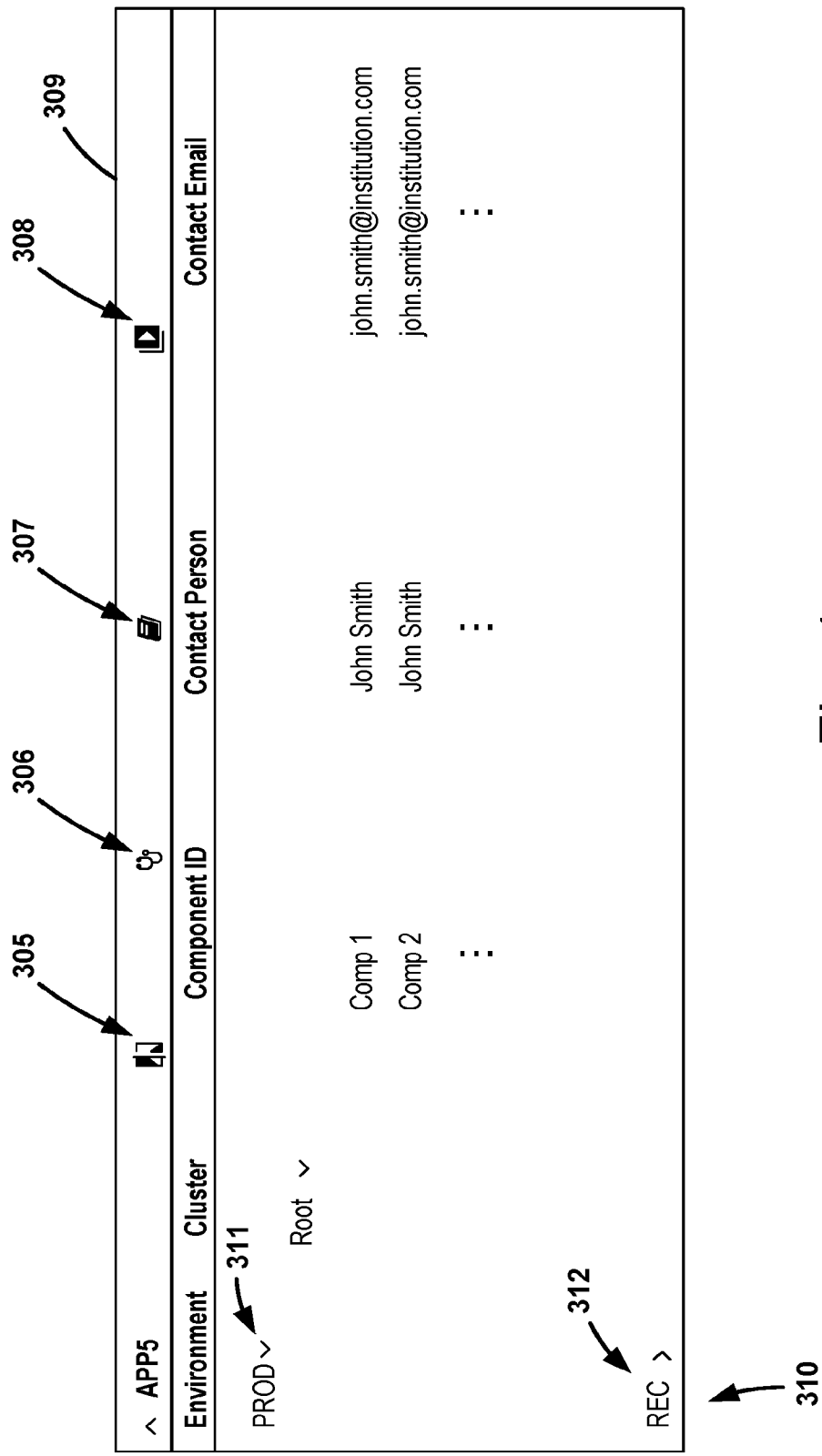
FIG. 4 is a further portion of an example graphical interface generated by the recovery management platform of FIG. 1.

Referring to FIG. 4, selection of the APP5 dropdown menu in FIG. 3 generates the GUI 309. The GUI 309 displays a list 310 of environments in which the selected application (APP5) runs. Each displayed environment has its own dropdown menu. In this example, a production environment (PROD) 311 and a recovery environment (REC) 312 are displayed, and the dropdown menu corresponding to PROD has been selected, causing to be displayed one or more clusters within the environment, one or more environment components within a cluster, and stakeholder contact information associated with each component.

Figure 5:
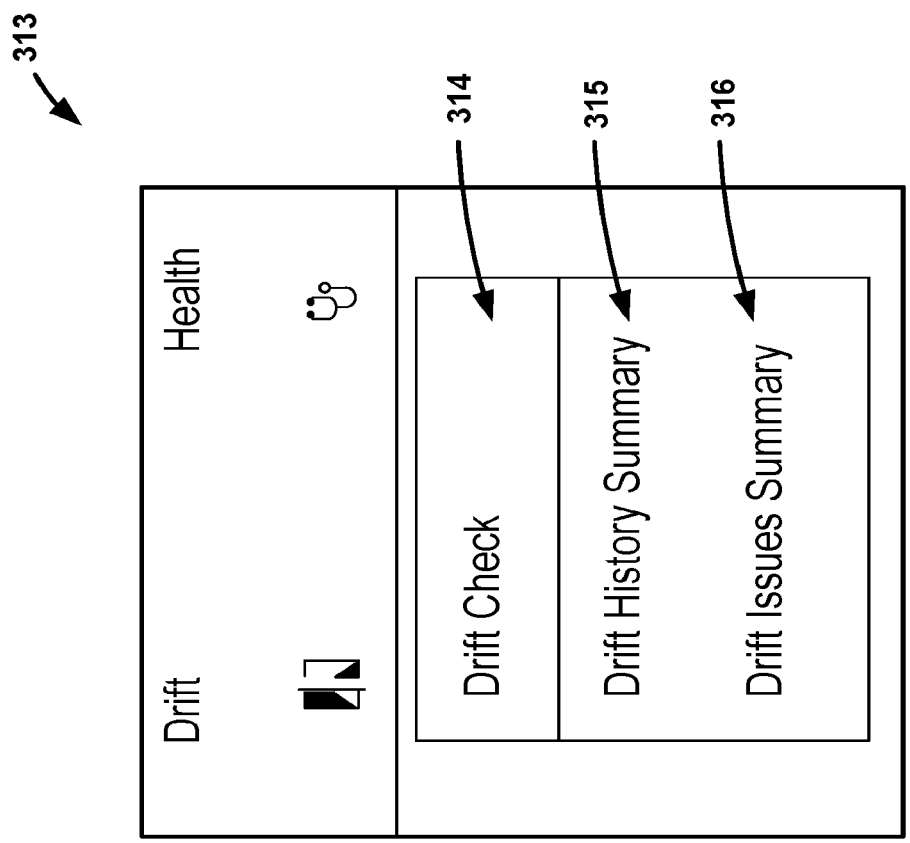
FIG. 5 is a further portion of an example graphical interface generated by the recovery management platform of FIG. 1.

Referring to FIG. 5, selection of the graphical element 305 corresponding to APP5 in FIG. 3, or selection of the graphical element 305 in FIG. 4, generates the GUI 313. The GUI 313 includes three selectable utilities, including a drift check utility 314, a drift history summary utility 315, and a drift issues summary 316. All of these utilities can be performed by the drift monitor 132 (FIG. 1).

Ideally, production and recovery environments have identical or near-identical configurations of applications to maintain consistency in the event of a failure. As the configurations within the different environments change over time, there emerges drift. This gap can lead to failures during a failure recovery or application deploy because the configuration of the production environment and the recovery environment are different. The drift monitor 132 (FIG. 1) enables stakeholders to monitor and be alerted to identify drifts between production and recovery environments, which helps the underlying systems remain resilient during failures and maintenance.

The drift monitor can be configured to can run at scheduled intervals across environments for all applications set up in the recovery management platform to provide the maintenance results using the platform GUIs.

The drift monitor compares running configurations between two environments for an application and identifies drift at different layers, such as a database layer, a middleware layer, an operation system layer, an application layer, and a recovery management platform layer.

Figure 6:
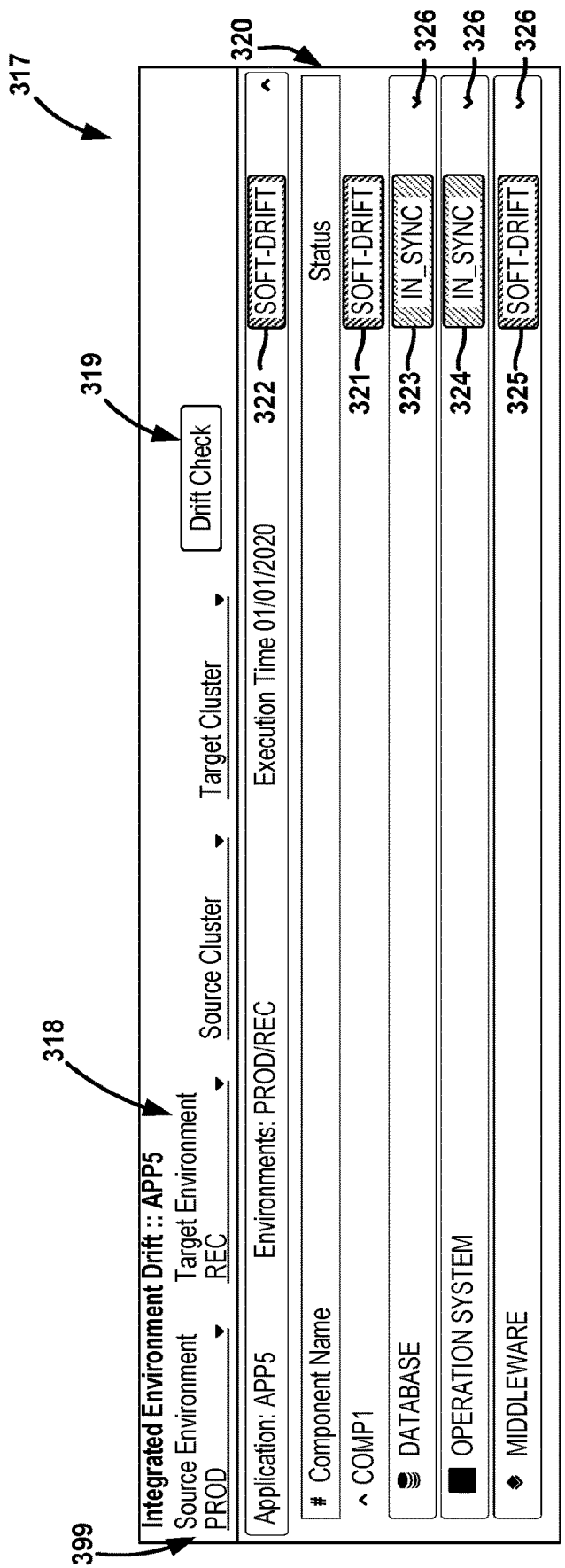
FIG. 6 is a further portion of an example graphical interface generated by the recovery management platform of FIG. 1.
Figure 7:
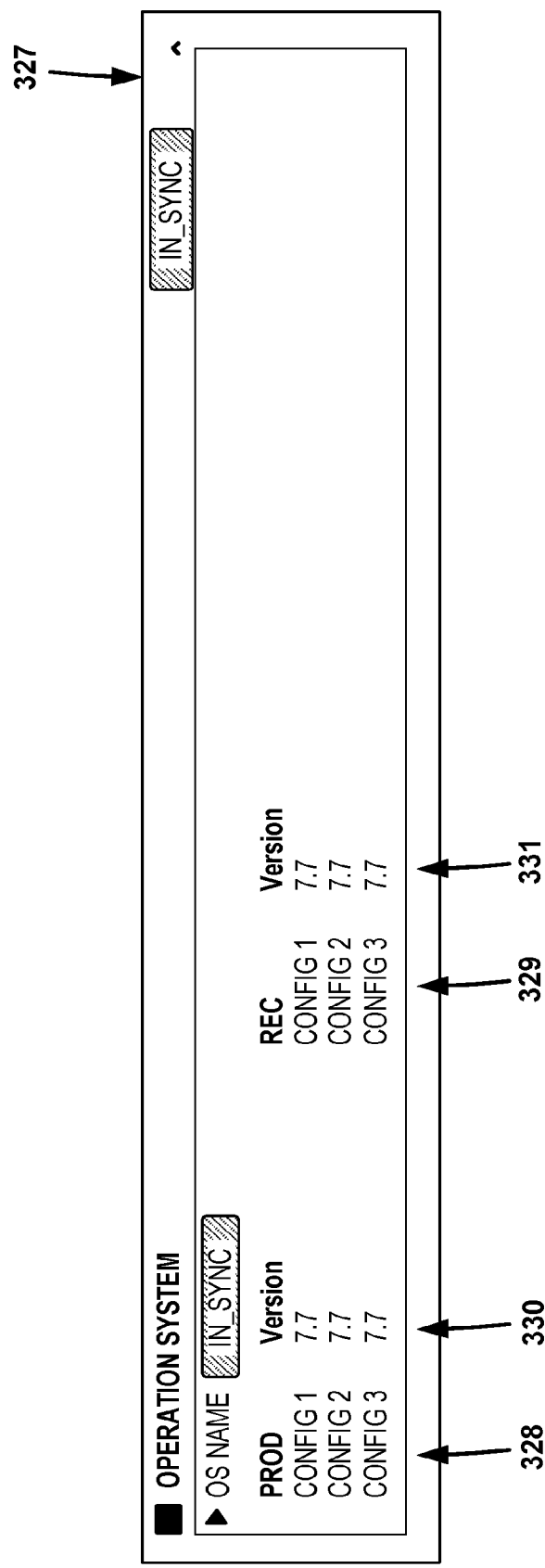
FIG. 7 is a further portion of an example graphical interface generated by the recovery management platform of FIG. 1.

The drift monitor can be configured also to provide on-demand drift checks requested by stakeholders via the platform GUIs. For example, selection of the drift check utility can generate a GUI such as the GUI 317 of FIG. 6. Referring to FIG. 6, the stakeholder selects a source environment from a dropdown menu 399 and a target environment from the dropdown menu 318. The drift monitor can be run by first identifying a specific application, in this example APP5, and then detecting drift based on the computing components required for APP5. In this example, the source environment is production and the target environment is recovery. The stakeholder has then selected the Drift Check button 319 to run a drift check. Selection of the Drift Check button 319 causes the drift monitor 132 (FIG. 1) to compare versioning and component configuration as between the source environment (in this example, PROD) and the target environment (in this example, REC). The comparison is performed at each of a database layer, an operation system layer, and a middleware layer, with respect to both the source and target environments, and with respect to each component. Summarized results of the drift check are displayed in the region 320 of the GUI 317.

The drift monitor 132 (FIG. 1) categorizes drift into multiple categories or severities. "In_Sync" indicates no drift, such that all configurations in a given layer or for a given component are matching. "Soft_Drift" indicates low severity drift and is appropriate if any configurations in a given layer or for an overall component of an application are not matching. "Hard_Drift" indicates higher severity than "Soft_Drift", meaning that the drift should be addressed and remedied more urgently than "Soft_Drift". "Not_Checked" means the relevant configurations are not available to compare.

The drift category indicators can be color coded on the GUI. For example, the GUI can display an "In_Sync" indicator as green, a "Soft_Drift" indicator as yellow, and a "Hard_Drift" indicator as red. In FIG. 6, the drift indicator 322 indicates present, real-time soft drift. In particular, the drift indicator 321 indicates that the component COMP1 has soft drift. The drift indicators 323 and 324 indicate that the database layer and operation system layer, respectively, of the component COMP1, have no drift. The drift indicator 325 indicates that the middleware layer of the component COMP1 has soft drift, which is the underlying drift causing the soft drift in the component.

In the region 320, each of the layers can be expanded using the corresponding dropdown button 326 to view additional information about the layer and the corresponding drift, if any. For example, selection of the dropdown button 326 of the operation system layer generates the GUI 327 of FIG. 7. The GUI 327 displays the operation system (OS) name, and the configurations 328 (CONFIG1, CONFIG2, CONFIG3, etc.), 329 being used in each of the source and target environments for that layer for the selected component. The GUI 327 also shows the corresponding versions 330, 331 of the configurations. In this example, there is no drift between the components of the OS layers in the PROD and REC environments which is consistent with the matching versioning and configurations being displayed in the GUI 327.

Figure 8:
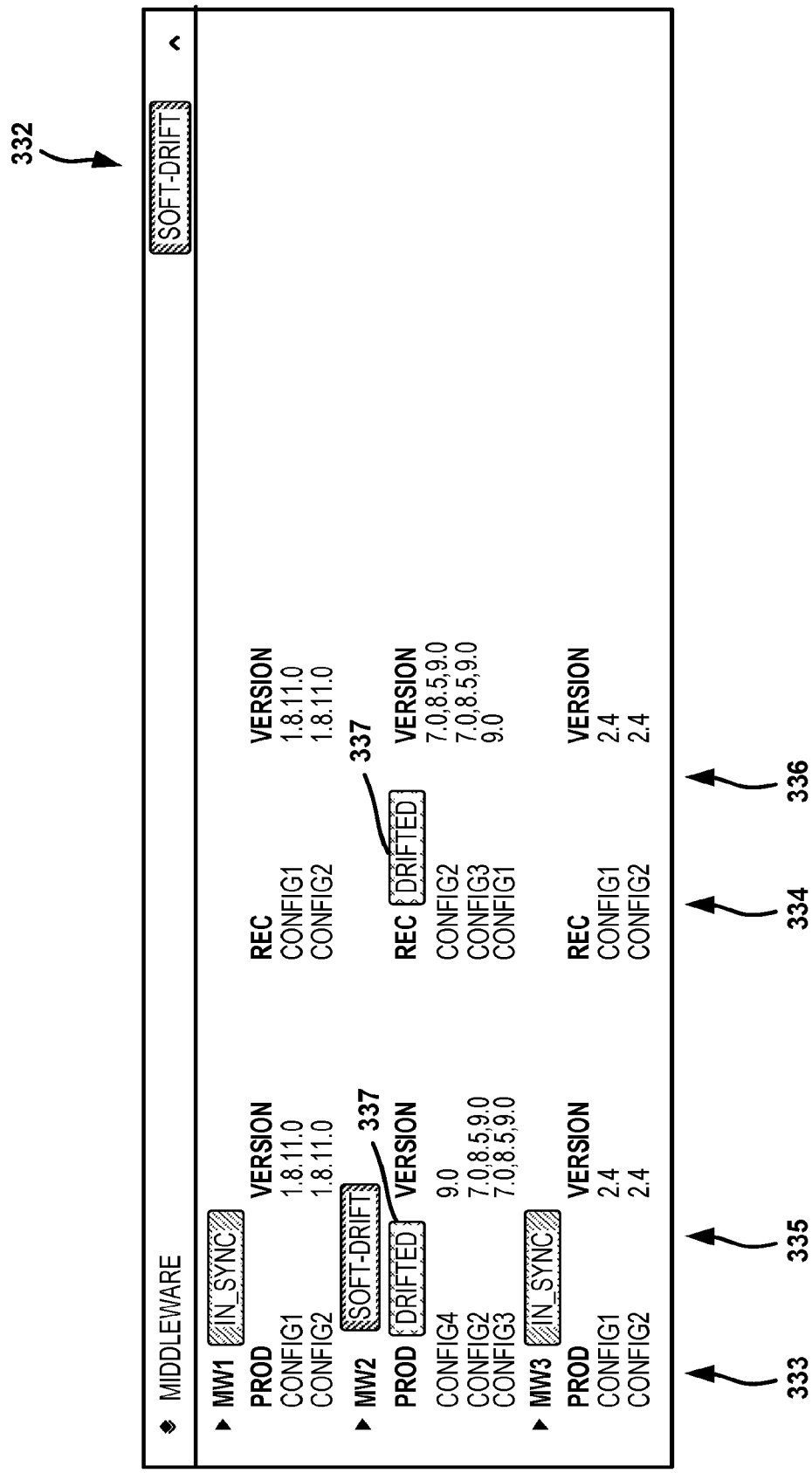
FIG. 8 is a further portion of an example graphical interface generated by the recovery management platform of FIG. 1.

Selection of the dropdown button 326 of the operation system layer of the GUI 317 of FIG. 6 generates the GUI 332 of FIG. 8. The GUI 332 displays the names MW1, MW2 and MW3 of three different sublayers of middleware being used by the operating system. The GUI shows the configurations 333, 334 (CONFIG1, CONFIG2, CONFIG3, etc.) being used in each of the source and target environments for the three sublayers in the middleware layer for the selected component. The GUI 332 also shows the corresponding versions 335, 336 of the configurations. In this example, there is no drift between the components of the MW1 and MW3 sublayers in the PROD and REC environments which is consistent with the matching versioning and configurations. However, in the sublayer MW2, CONFIG4 in the PROD environment does not have a matching configuration in MW2 of the REC environment, such that there is drift, indicated by the "Drifted" indicators 337, at this level.

Selection of the Drift History Summary utility 315 of the GUI 313 (FIG. 5) can generate portions of the GUI 338 of FIG. 9, in which a stakeholder has pulled a drift check history by entering, or selecting from dropdown menus, parameters for the history report. The parameters can include an identifier (e.g., an application to anchor the search) name and the date range for the history to be pulled. The stakeholder has then selected the Submit button 339 to generate the drift history report 340 using the drift monitor tool. The drift history report 340 includes a listing of each drift check that matches the report parameters and indicates, for each drift check, when the drift check was conducted, the environments that were compared, the mode of execution 341, the overall drift result 342, and the drift result 343, 344, 345 for each layer. The mode of execution 341 can be "SCHEDULED", which is an execution that was automatically performed by the system at a predefined time, or "ONDEMAND", which is an execution that was requested by a stakeholder. The results can include text, e.g., "DRIFTED" or "IN_SYNC" and/or color indicators to indicate drift severity. The drift results 343, 344, 345 are color coded according to the severity of drift, if any.

Selection of the drift issues summary 316 of the GUI 313 (FIG. 5) can generate portions of the GUI 346 of FIG. 10, in which a stakeholder has pulled drift issue summary by entering, or selecting from drop down menus, parameters for the summary report. The stakeholder has then selected the Submit button 347 to generate the drift issue summary report 348. Selection of the Submit button 347 causes the drift monitor tool to generate the drift issue summary report 348, which includes details about each drift check in the selected timeframe and meeting the other selected parameters, that identified some drift, including where the drift was found and the severity of the drift (e.g., by color coded indicators). Each identified drift from a drift check created a drift issue, which has an associated issue ID. The drift issues are listed in the drift issue summary report 348 by their issue ID 349.

Drift histories, such as the drift history report 340, and drift summaries, such as the drift issue summary report 348, can improve failure/recovery visibility for stakeholders by helping stakeholders identify drift trends, identify resolved and unresolved drift issues, and determine if drift checks are being performed too frequently or too infrequently.

The health checker tool 134 (FIG. 1) is configured to perform health checks to effectively measure the status of applications and dependent services using the configurations details of applications. The current health of a given component is determined by comparing it to a predefined steady-state or healthy state.

Health checks performed by the health checker tool 134 can be scheduled at predefined intervals and/or or performed on-demand by stakeholder selection of the health check button associated with an application.

Figure 11:
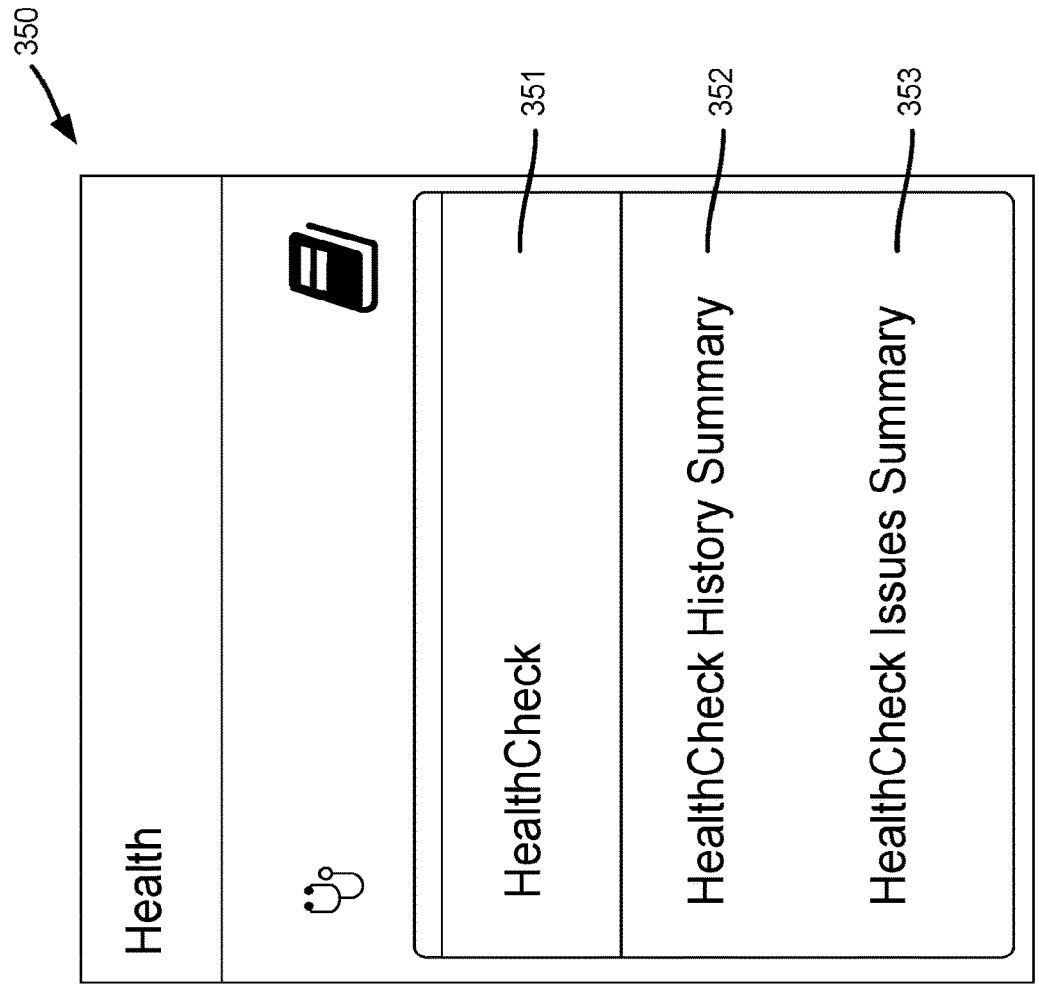
FIG. 11 is a further portion of an example graphical interface generated by the recovery management platform of FIG. 1.

Referring to FIG. 11, selection of the graphical element 306 corresponding to APP5 in FIG. 3, or selection of the graphical element 306 in FIG. 4, generates the GUI 350. The GUI 350 includes three selectable utilities, including a health check utility 351, a health check history summary utility 352, and a health check issues summary 353. All of these utilities can be performed by the health checker tool 134 (FIG. 1).

Figure 12:
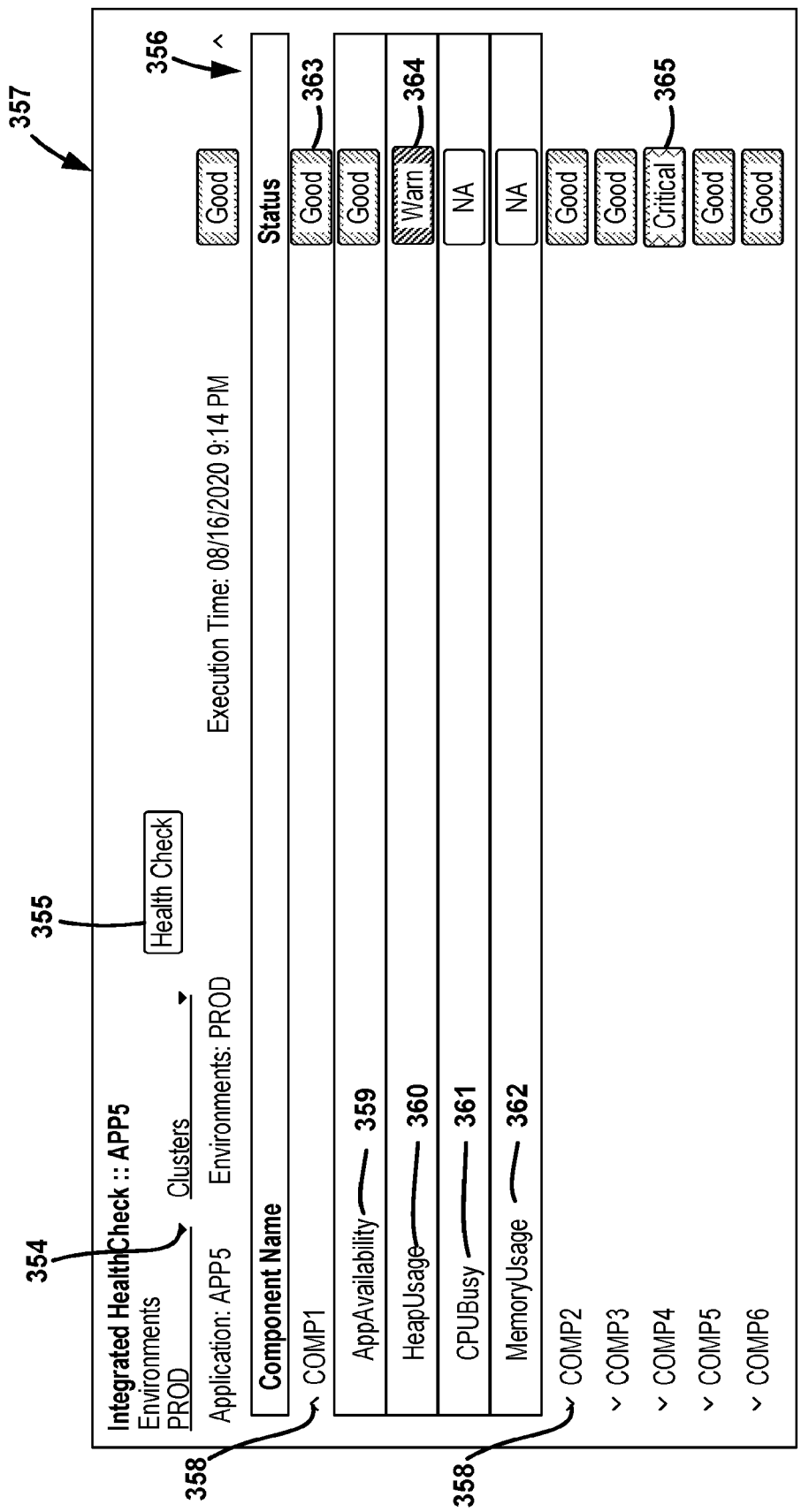
FIG. 12 is a further portion of an example graphical interface generated by the recovery management platform of FIG. 1.

Referring to the GUI of FIG. 12, the stakeholder, for a selected application (in this example, APP5) selects an environment from a dropdown menu 354. In this example, the production environment has been selected. The stakeholder has then selected the Health Check button 355 to run a health check on APP5. Selection of the Health Check button 355 causes the health checker tool 134 (FIG. 1) to compare current health metrics for components used to run APP5 operating in the PROD environment with predefined baseline or steady-state metrics. The comparison is performed for each metric for each component for the selected application operating in the selected environment.

The region 356 of the GUI 357 includes a listing of components that can be expanded by selection of dropdown buttons 358 to display health metrics within the component. Each metric can also be selected to display additional details regarding specific locations within each component where the health has been checked. In this example, the metrics for the component COMP1 include an AppAvailability metric 359, a HeapUsage metric 360, a CPUBusy metric 361, and a MemoryUsage metric 362. These metrics indicate accessibility of the application and the magnitude of the application's drain on computing resources within a given environment. If these metrics deteriorate relative to the baseline or steady-state, a health issue is identified by the health checker. The health checker tool 134 (FIG. 1) determines a severity of the issue and attaches a corresponding status label. For example, the checked health of a given component or metric ban can be assigned a status of Good, Warn, Critical, or Not Available (NA). Warn and Critical labels indicate departure from the steady-state by an appreciable amount, with Critical being more serious or severe than Warn. Good indicates no appreciable departure from the steady-state. The health statuses 363, 364, 365 are displayed in the region 356. In some examples, the health statuses are color coded according to their severity.

Selection of the health check history summary utility 352 of the GUI 350 (FIG. 11) can generate portions of the GUI 366 of FIG. 13, in which a stakeholder has pulled a health check history for APP5 by entering, or selecting from dropdown menus, parameters for the history report. The parameters include the application name and the date range for the history to be pulled. The stakeholder has then selected the Search button 367 to generate the health check history report 368 using the health checker tool. The health check history report 368 includes a listing of each health check that matches the report parameters and indicates, for each health check, when the health check was conducted, the environment, the mode of execution, the overall health results 370, and the health results 369 for each metric. The mode of execution can be "SCHEDULED", which is an execution that was automatically performed by the system, or "ONDEMAND", which is an execution that was requested by a stakeholder. The results can include text, e.g., "CRITICAL" or "WARN" or "GOOD" and/or color indicators to indicate health severity. The metric results 369 are color coded according to the health severity indicated by the metric.

Selection of the health check issues summary 353 of the GUI 350 (FIG. 11) can generate portions of the GUI 371 of FIG. 14, in which a stakeholder has pulled a health check issue summary for APP5 by entering, or selecting from dropdown menus, parameters for the summary report. The stakeholder has then selected the Search button 372 to generate the drift issue summary report 373. Selection of the Search button 372 causes the health checker tool to generate the drift issue summary report 373, which includes details about each health check, in the selected timeframe and meeting the other selected parameters, that identified some health issue (Warn or Critical), including where the health issue was found and the severity of the issue (e.g., by color coded indicators).

Health check histories, such as the health check history report 368, and health issue summaries, such as the drift issue summary report 373, can improve failure/recovery visibility for stakeholders by helping stakeholders identify health issue trends, identify resolved and unresolved health issues, and determine if health checks are being performed too frequently or too infrequently.

Figure 15:
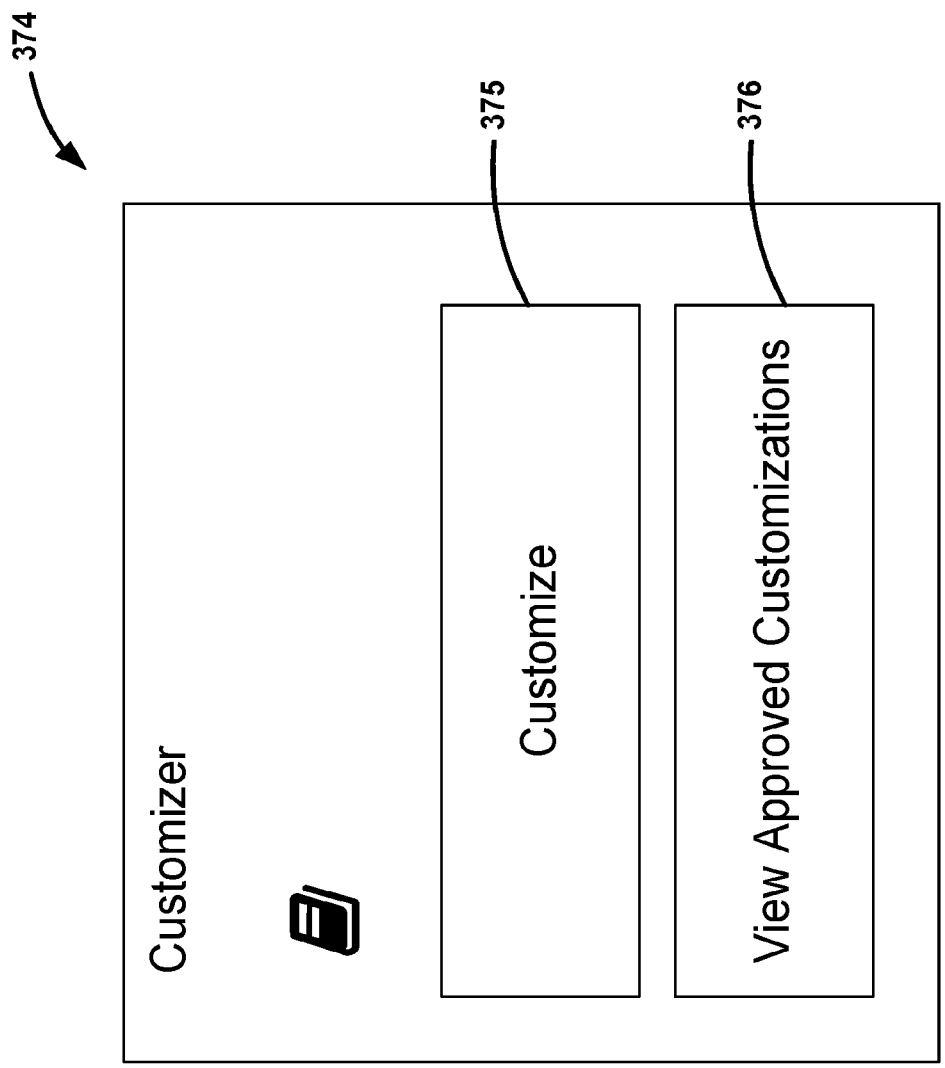
FIG. 15 is a further portion of an example graphical interface generated by the recovery management platform of FIG. 1.

Referring to FIG. 15, selection of the graphical element 307 corresponding to APP5 in FIG. 3, or selection of the graphical element 307 in FIG. 4, generates at least portions of the GUI 374. The GUI 374 includes two selectable utilities, including a customize utility button 375, and a view approved customizations utility button 376. These two utilities are performed by the recovery customizing tool 136 (FIG. 1). Additional features of the recovery customizing tool, which can be accessed via the GUI 374, will now be described.

Recovery customizations by stakeholders can be in development, awaiting approval, approved and implemented, or rejected.

A customization can be a modification to an existing recovery protocol or an introduction of a new recovery protocol. Each protocol is associated with a particular failure event type. Each protocol corresponds to a computer-executable failure script. The steps of the protocol are aspects that determine whether and how to perform a recovery operation.

Each protocol can be assigned by the stakeholder a recovery time objective (RTO) and a recovery point objective (RPO). A RTO is the amount of downtime the institution can tolerate for a given application or service before requiring a fix of the failed component or a transfer to a back-up component. A RPO is the amount of time between regular data backups and indicates the amount of data loss the institution can tolerate if a failure occurs between backups. Protocols are assigned a RTO and a RPO as aspects of the protocol that dictate, in part, whether the protocol should be executed in response to a given failure stimulus.

In some examples, each protocol is associated with a template. The template can be created and modified by the stakeholder using the recovery customizing tool 136 (FIG. 1). A template includes a list of steps to be taken when executing the protocol. Templates can be implemented across a single institution, and also across multiple institutions, standardizing steps to be taken in a given failure event, regardless of the environment or mainframe impacted by the failure. An example of a step of a template is an instruction executed by the recovery management platform 102 that pauses data traffic to a defined data center impacted by a failure event.

Different protocols can be applied to different stages of a recovery. For example, types of protocols can include pre-validation protocols, recovery protocols, post-validation protocols, and failback protocols. The recovery customizing tool 136 (FIG. 1) is configured to provide various interfaces using the user interface 144 (FIG. 1), whereby stakeholders can search for existing protocols, modify existing protocols, view the status of existing protocols, view details about existing protocols, create new protocols, request approval for protocols, submit approval of protocols, provide notifications of approvals, rejections and modifications of protocols, and so forth. Access to these functions can be gained by selection of the customize utility button 375 and View Approved Customizations button of the GUI 374.

In addition, the customizing tool requires stakeholders to prescribe an order of steps for each protocol. The steps and/or order of steps can be defined by one or more templates. When executing an approved and implemented protocol, the recovery management platform 102 (FIG. 1) executes the steps in the prescribed order. Some steps can be executed automatically. Other steps may require stakeholder input to be executed.

Figure 16:
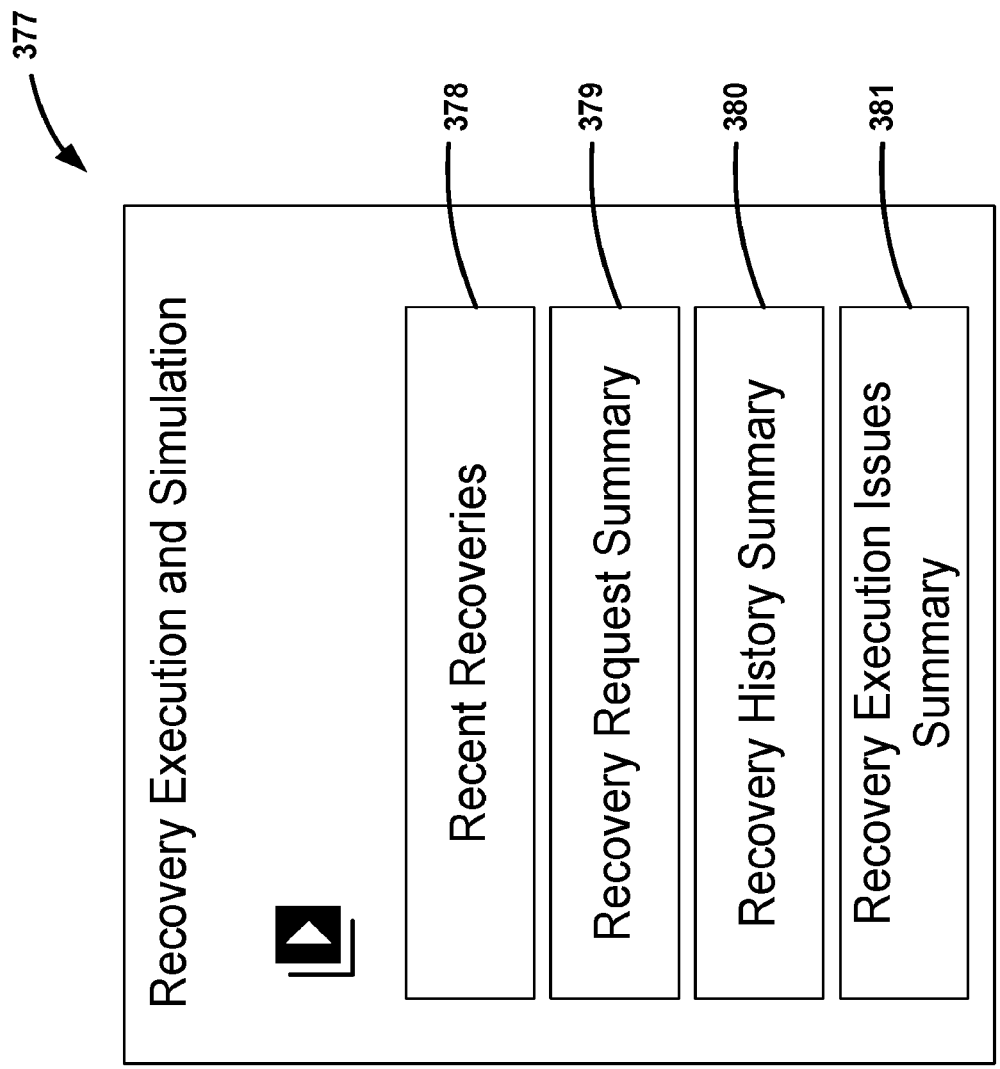
FIG. 16 is a further portion of an example graphical interface generated by the recovery management platform of FIG. 1.

Referring to FIG. 16, selection of the graphical element 308 corresponding to APP5 in FIG. 8, or selection of the graphical element 308 in FIG. 4, generates the GUI 377. The GUI 377 includes four selectable utilities, including a recent recoveries utility 378, a recovery request summary 379, a recovery execution history summary 380, and a recovery execution issues summary 381, which can be performed for the selection application. All of these utilities can be performed by the failover execution tool 140 and failure simulator 138 (FIG. 1). Additional features of these utilities (collectively, the recovery utilities), which can be accessed via the GUI 377, will now be described.

The recovery utilities provide an efficient approach to help application teams failover consistently to recovery infrastructure in a faster and more predictable manner by executing the scripts associated with the protocols described above and eliminating at least some typically manual activities.

Selection of the recent recoveries utility 378 (FIG. 16) allows a stakeholder to view and review, via the user interface 144 (FIG. 1) recent requests for recovery executions for a specified application that have not yet been completed. Such requests could be, e.g., pending approval by another stakeholder.

Selection of the recovery request summary 379 (FIG. 16) allows a stakeholder to view and review, via the user interface 144 (FIG. 1), all finalized recovery execution requests that were created for the specified application within a specified time period (e.g., 14 days). The status of each finalized request is also displayed. The status can indicate, for example, that requested recovery has been initialized, is in progress, has been completed, or has been rejected. Each execution generates an execution record, which can also be viewed using the recovery request summary 379.

Selection of the recovery request summary 379 can also enable the stakeholder to create a new recovery execution request. To create a new request, the stakeholder inputs recovery related information into the recovery management platform 102 (FIG. 1) via the user interface. The information can include, for example, the source and target environments for the recovery, and a selected application that has associated components that run in the source and target environments. Stakeholders who own the recovery application will typically have to review and approve the request before it can be executed. When a new recovery request has been created the recovery management platform can automatically send an alert (e.g., an email, a text message) to the relevant approvers to review and approve or reject the request. Approvers can view all requests pending their approval when they log into the recovery management platform. A cancellation feature enabled by the recovery management platform via the user interface allows the requester to cancel a recovery request prior to its approval.

Once a recovery request has been approved, the stakeholder can execute the recovery via the user interface. FIG. 17 illustrates a GUI 382 for an approved and initialized recovery between the production environment and recovery environment. The GUI 382 includes a display area 383 with various buttons for expanding and contracting viewable information. A summary bar 384 indicates the status of all execution steps. The execution steps include a drift check based on components associated with the selected application and the selected environments, followed by a health check, followed by an inquiry to insure that the relevant protocols and associated scripts for performing the recovery is available, followed by execution of the script, which performs the recovery operations, followed by another health check. If any step fails to execute, an alert can be issued automatically to the stakeholder via the user interface and the stakeholder is given an option whether to proceed or stop recovery execution.

Selection of the dropdown menu button 385 allows the stakeholder to access the relevant protocols for the initialized recovery, allowing the stakeholder to complete all manual steps of the protocols. Automated steps of the protocols are performed automatically by the recovery management platform 102. The interface can indicate graphically what steps have been completed and what steps still require action by the stakeholder. For example, the stakeholder may be required at some point during execution of a recovery protocol to reroute internet protocol (IP) traffic from one server to another server.

Results of each step taken and when it was taken can be manually recorded, or automatically recorded. Overall recovery execution results are also made available via the recovery management platform.

In addition to using the recovery execution utilities to perform actual recoveries, the same utilities can be used to perform simulated recoveries using a simulation environment as the source environment and/or target environment. Results of simulated recoveries can, e.g., inform stakeholders regarding the performance of protocols and scripts, and whether adjustments may be needed. Simulations also can be used to identify and root out inefficiencies in protocols and inconsistencies between protocols and thereby reduce the amount of time it takes to create, approve and execute a recovery, such that recovery executions are more likely to comply with the institution's RPO and RTO requirements. Because the simulations are run in a separate environment, disruptions to normal operations can be avoided.

Selection of the recovery execution history summary 380 of the GUI 377 (FIG. 16) can generate portions of the GUI 386 of FIG. 18, in which a stakeholder has pulled a recovery execution history by entering, or selecting from dropdown menus, parameters for the history report. The parameters include an application name and the date range for the history to be pulled. The stakeholder has then selected the Search button 387 to generate a recovery execution history report 388 using the failover execution tool 140 (FIG. 1). The recovery execution history report 388 includes a listing of each recovery execution request that matches the report parameters and indicates, for each request, when request was requested, the environments involved, and rows 389 of color-coded status markers 390 for each stage of the recovery request. The stages can include, for example, an approval stage, a drift check stage, a pre health check stage, protocol availability check stage, a protocol run stage, and a post heath check stage, with each of the color coded status markers 390 corresponding to a different stage for the corresponding recovery request. The statuses represented by the different colors can include, for example, an approved status, a warning status, a failure status, an initialized status, and a not available status.

Selection of the recovery execution issues summary 381 of the GUI 377 (FIG. 16) can generate portions of the GUI 391 of FIG. 19, for which a stakeholder has pulled drift issue summary by entering, or selecting from drop down menus, parameters for the summary report. The stakeholder has then selected the Search button 392 to generate the recovery execution issue summary report 393, which includes details about each executed recovery in the selected timeframe and meeting the other selected parameters, that resulted in an execution failure or inconsistency.

Recovery execution histories, such as the 388, and recovery execution summaries, such as the recovery execution issue summary report 393, can improve failure/recovery visibility for stakeholders by helping stakeholders identify recovery script failures and inconsistencies and other execution failures and inconsistencies.

Computer Architecture Supporting the Recovery Management Platform

Figure 20:
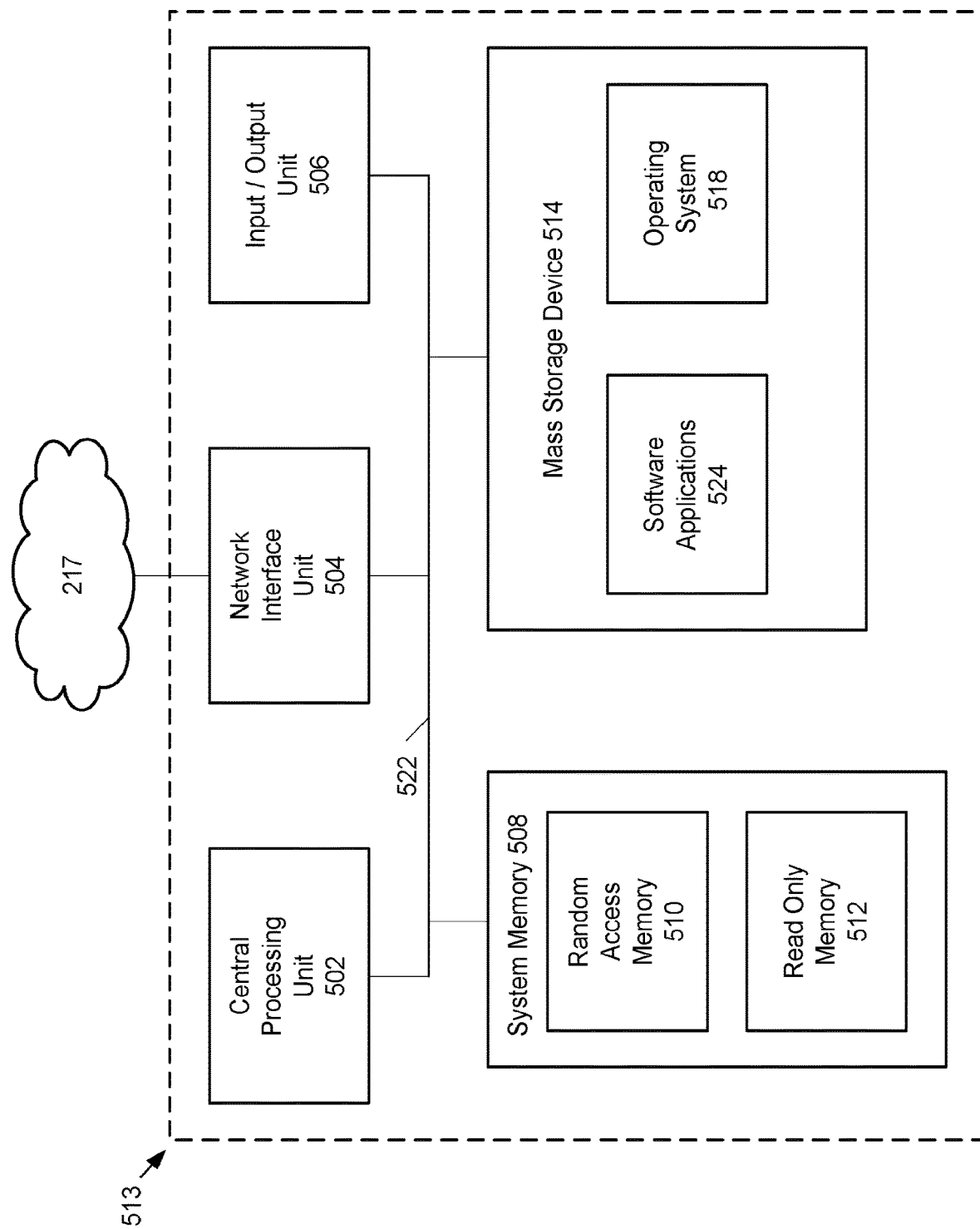
FIG. 20 schematically shows example physical components of portions of the recovery management platform of FIG. 1.

As illustrated in the example of FIG. 20, a server computer 513 provides the computing resources to run the recovery management platform 102 (FIG. 1). The server computer 513 can be an internally controlled and managed device (or multiple devices) of the institution. Alternatively, the server computer 513 can represent one or more devices operating in a shared computing system external to the institution, such as a cloud computing environment.

Via the network 217, the server computer 513 can interact with the computing equipment that run the various application environments of the institution that may, from time to time, require recovery. Such equipment can include, for example, the primary computing equipment 104 (FIG. 1) and the recovery computing equipment 106 (FIG. 1).

The server 513 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the server computer 513, such as during startup, is stored in the ROM 512. The server computer 513 further includes a mass storage device 514. The mass storage device 514 is able to store software instructions and data, such as software instructions and data required to run the recovery management tools 103 (FIG. 1).

The mass storage device 514 is connected to the CPU 502 through a mass storage controller (not shown) connected to the system bus 522. The mass storage device 514 and its associated computer-readable data storage media provide non-volatile, non-transitory storage for the server computer 513. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 513.

According to various embodiments of the invention, the server computer 513 may operate in a networked environment using logical connections to remote network devices through the network 217, such as a wireless network, the Internet, or another type of network. The server computer 513 may connect to the network 217 through a network interface unit 504 connected to the system bus 522. It should be appreciated that the network interface unit 504 may also be utilized to connect to other types of networks and remote computing systems. The server computer 513 also includes an input/output unit 506 for receiving and processing input from a number of other devices, including a touch user interface display screen, or another type of input device. Similarly, the input/output unit 506 may provide output to a touch user interface display screen or other type of output device, including, for example, the user interface 144 (FIG. 1).

As mentioned briefly above, the mass storage device 514 and the RAM 510 of the server computer 513 can store software instructions and data. The software instructions include an operating system 518 suitable for controlling the operation of the server computer 513. The mass storage device 514 and/or the RAM 510 also store software instructions and applications 524, that when executed by the CPU 502, cause the server computer 513 to provide the functionality of the recovery management platform 102 (FIG. 1).

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer implemented method, comprising:
monitoring drift between a computing system of a production environment and another computing system of a recovery environment, the another computing system of the recovery environment being configured to perform tasks of the computing system of the production environment that fail over to the recovery environment;
simulating a failure event for the production environment by executing a failure script in a simulation environment that is different from the production environment; and
automating a failover to the recovery environment, including executing a failure protocol defined by the failure script.

2. The method of claim 1, wherein monitoring drift includes determining whether there is a difference between a recovery version of a component associated with the recovery environment and a production version of the component associated with the production environment.

3. The method of claim 2, further comprising detecting a drift between the recovery version of the component and the production version of the component.

4. The method of claim 3, wherein the component is a portion of a software application.

5. The method of claim 1, wherein the failure protocol includes a rerouting of internet protocol traffic from one server to another server.

6. The method of claim 1, further comprising determining an inefficiency in the failure protocol or in the failure script.

7. The method of claim 6, wherein the inefficiency is determined based on simulating the failure event in the simulation environment.

8. The method of claim 1, wherein the simulation environment includes multiple layers.

9. The method of claim 8, wherein the multiple layers include at least two of a hardware layer, a middleware layer and an operating system layer.

10. The method of claim 1, wherein the failure script defines one or more conditions that trigger initiation of the failover.

11. A system for managing data center failure events, comprising:
one or more processors; and
non-transitory computer-readable storage media encoding instructions which, when executed by the one or more processors, cause the system to:
monitor drift between a computing system of a production environment and another computing system of a recovery environment, the another computing system of the recovery environment being configured to perform tasks of the computing system of the production environment that fail over to the recovery environment;
simulate a failure event for the production environment by executing a failure script in a simulation environment that is different from the production environment; and
automate a failover to the recovery environment, including executing a failure protocol defined by the failure script.

12. The system of claim 11, wherein to monitor drift includes to determine whether there is a difference between a recovery version of a component associated with the recovery environment and a production version of the component associated with the production environment.

13. The system of claim 12, wherein the instructions, when executed by the one or more processors, further cause the system to detect a drift between the recovery version of the component and the production version of the component.

14. The system of claim 13, wherein the component is a portion of a software application.

15. The system of claim 11, wherein the failure protocol includes a rerouting of internet protocol traffic from one server to another server.

16. The system of claim 11, wherein the instructions, when executed by the one or more processors, further cause the system to determine an inefficiency in the failure protocol or in the failure script.

17. The system of claim 16, wherein the inefficiency is determined based on a simulation of the failure event in the simulation environment.

18. The system of claim 11, wherein the simulation environment includes multiple layers.

19. The system of claim 18, wherein the multiple layers include at least two of a hardware layer, a middleware layer and an operating system layer.

20. The system of claim 11, wherein the failure script defines one or more conditions that trigger initiation of the failover.

* * * * *